UNITED STATES PATENT OFFICE.

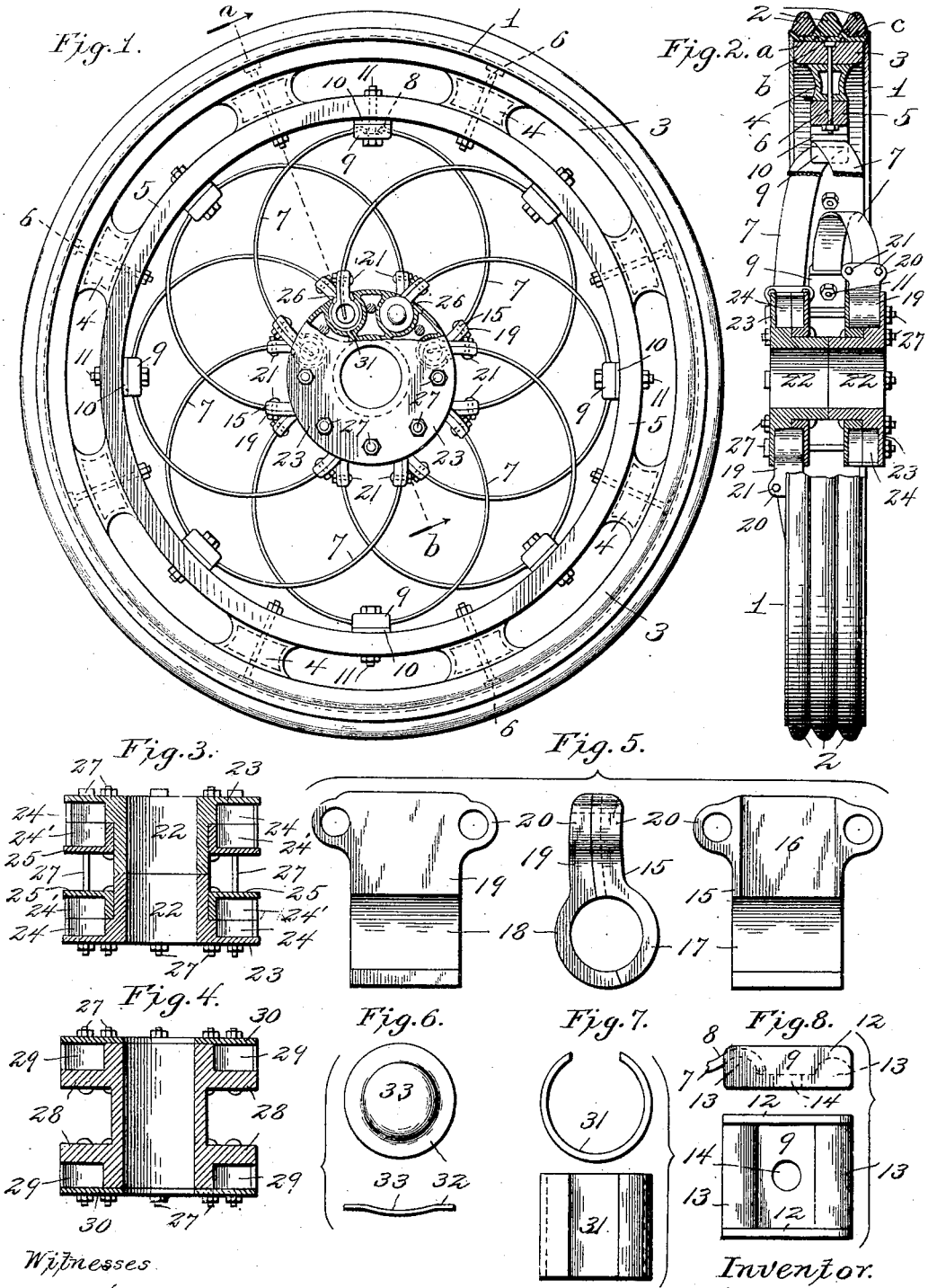

GEORGE D. MUNSING, OF NEW YORK, N. Y.

VEHICLE-WHEEL.

No. 809,205.    Specification of Letters Patent.    Patented Jan. 2, 1906.

Application filed March 20, 1905. Serial No. 251,103.

*To all whom it may concern:*

Be it known that I, GEORGE D. MUNSING, a citizen of the United States, residing at the city of New York, in the county and State of New York, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to vehicle-wheels, and more particularly to wheels for automobiles, touring-cars, and like vehicles, and has for its object the construction of a spring-wheel whose spokes are rotatably held in the hub, together with details of construction to be hereinafter described and claimed.

Referring to the drawings, in which like parts are similarly designated, Figure 1 is an elevation of a wheel with part of the hub-flange broken away. Fig. 2 is a section on the line $a\ b$, Fig 1. Fig. 3 is a longitudinal section of the hub. Fig. 4 is a longitudinal section of a modification of a hub. Fig. 5 is a view showing the hinge member to secure the spring-spokes in the hub. Fig. 6 is a view showing the end washer for said member. Fig. 7 is a view showing the peripheral wearing-piece of said member, and Fig. 8 is the securing member for the outer ends of the spokes.

The wheel comprises a rim 1, having a plurality of peripheral seats or grooves, here shown as three seats $a$, $b$, and $c$, into each one of which is fitted or seated a tire 2 independent of the other tires, so that the side tires may be replaced at will or the central tire be replaced without disturbing the side tires. The rim, like most metal rims now in use, is made of a comparatively heavy sheet of metal, but differs from such rims in that the metal is crimped or struck up to form the ribs and side flanges, as shown in section in Fig. 2. The rim is mounted on the felly 3, that is spaced by hollow metal spacing-blocks 4, preferably, but not necessarily, of aluminium, from the inner rim 5, bolts 6 passing through the parts named to hold them assembled. Each spoke 7 consists of a flat spring-metal piece having at its outer end a substantially semicircular bend 8, that is held between a securing member 9 and a wear-plate 10, preferably, but not necessarily, of brass, by bolts 11 passing through the inner rim 5.

The securing member 9 has two lateral flanges 12 to form a channel and two semicircular beads 13 at each end of the member extending between the two flanges 12 and across the channel, the bolt-hole 14 passing through the member between the two beads and between the two flanges, as shown. The curved or semicircularly-bent ends 8 of a spoke seat on a bead 13 and have a limited rotation on the same.

The inner or hub end of each spoke is held in a clamp, Fig. 5, consisting of two members, one of which, 15, has a channel 16 in its shank for the reception of the hub end of the spoke, that may or may not project past the inner end of said channel into the tubular portion of the clamp, of which the part 15 has at its end the portion 17 that forms part of said tubular portion, the other part of said tubular portion 18 being formed on the other member 19.

The member 19 may or may not have a similar channel in its shank, and each member is provided with perforated ears 20, those on one member registering with those on the other, so that when the two members are secured together by bolts 21 passed through the perforations in the ears they will securely hold the end of the spoke and at the same time permit the effective spoke length to be varied within limits.

The hub consists of two parts 22, having end flanges 23, into which are bored cylindrical recesses 24, with longitudinal slots 26 cut through the edge of the flange into the recesses and through which slots project the shanks of the clamp, while the tubular portion of the clamp has bearing in the recess.

Around the hub and to each flange are secured either circular or semicircular plates 25, also provided with recesses 24′, that register with those 24, so that when assembled by bolts 27 these plates and hub-flanges form socket-bearings for the tubular portions of the clamp. In some cases it is convenient to do away with the recess 24′ in the plates, and I then make the hub as shown in Fig. 4, where the two flanges 28 and hub are made in a single piece, the recesses 29 being bored into the flange from the outer face instead of from the inner face of said flange, so that only a cover-plate 30 need be secured on the outer faces of the spool-shaped hub to close the open end of the circular recesses 29.

When the hub is assembled, there is placed around the tubular portion of the clamp a brass or other metallic split washer 31, Fig. 7, and over the ends of the tubular portion of the clamp a washer 32, Fig. 6, having a central dished portion 33. These washers 31 and 32 will serve to prevent rattling, to keep two metals of the same character from grinding together, and to take up wear.

Having thus described my invention, what I claim as new therein, and desire to secure by Letters Patent, is—

1. In a vehicle-wheel, an inner rim, a hub, spring-spokes having their outer ends bent, a two-part clamp to adjustably hold the hub end of each spoke and having bearing in the hub, and a channel-shaped securing member having transverse beads over which the outer bent ends of said spokes take and around which said bent ends are capable of rotation, substantially as and for the purpose set forth.

2. In a vehicle-wheel, a hub having flanges and bearing-recesses formed in the flanges, in combination with spokes, a clamp to hold the hub end of the spokes, said clamp held and having bearing in said recesses, substantially as described.

3. In a vehicle-wheel, a spool-shaped hub having flanges at its ends, circular recesses formed in said flanges, in combination with spring-spokes, a two-part clamp to hold the hub end of each spoke and having a cylindrical portion to enter said recesses and a cover-plate to hold said clamps in the recesses, substantially as described.

4. In a vehicle-wheel, a spool-hub having flanges at its ends, circular recesses in each flange extending partly through them, in combination with spring-spokes, a two-part clamp having a cylindrical portion, to hold the hub end of each spoke, said cylindrical portion having bearing in a recess in the hub-flange, plates having recesses to register with those in the flanges and secured to said flanges.

5. In a vehicle-wheel, a two-part spool-shaped hub having flanges at its ends, circular recesses in each flange extending partly through them, two-part cover-plates having circular recesses extending partly through them and registering with those in the flanges; in combination with a two-part clamp for the hub end of each spoke having a tubular portion to have bearing in the registering recesses and means to secure each plate to its respective flange.

6. In a vehicle-wheel, the combination with the spokes and a hub having recesses formed therein, of clamp members for the hub ends of the spokes having bearing ends retained in and having bearing in said recesses, a metallic piece between the bearing end of said clamp and the walls of the recess to take up wear and prevent rattling.

7. In a vehicle-wheel, the combination with spokes and a hub having cylindrical recesses around its periphery, of clamp members for the hub ends of the spokes having a cylindrical bearing end, retained in and having bearing in said recesses, cylindrical wear-pieces around said cylindrical end and circular washers in said recesses at the ends of said cylindrical bearing ends, said washers and wear-pieces of a metal differing from that of said members and hub.

In testimony that I claim the foregoing as my invention I have signed my name in presence of two subscribing witnesses.

GEORGE D. MUNSING.

Witnesses:
S. W. HARRELL,
E. D. PRESTON.